(12) United States Patent
Haag et al.

(10) Patent No.: US 12,271,015 B2
(45) Date of Patent: Apr. 8, 2025

(54) OPTICAL FILM AND OPTICAL STACK

(71) Applicant: 3M INNOVATIVE PROPERTIES COMPANY, St. Paul, MN (US)

(72) Inventors: Adam D. Haag, Woodbury, MN (US); Yi-Chen Chen, Zhubei (TW); Tze Yuan Wang, New Taipei (TW); Hiroki Matsuda, Tendo (JP); Michelle L. Toy, North St. Paul, MN (US); Ryan J. Eismin, St. Paul, MN (US); John F. VanDerlofske, III, Minneapolis, MN (US); David J. McDaniel, Lino Lakes, MN (US); Matthew B. Johnson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 555 days.

(21) Appl. No.: 17/605,395

(22) PCT Filed: May 20, 2020

(86) PCT No.: PCT/IB2020/054788
§ 371 (c)(1),
(2) Date: Oct. 21, 2021

(87) PCT Pub. No.: WO2020/234801
PCT Pub. Date: Nov. 26, 2020

(65) Prior Publication Data
US 2022/0236466 A1    Jul. 28, 2022

Related U.S. Application Data

(60) Provisional application No. 62/851,991, filed on May 23, 2019.

(51) Int. Cl.
*G02B 5/30* (2006.01)

(52) U.S. Cl.
CPC .................................. *G02B 5/305* (2013.01)

(58) Field of Classification Search
CPC . G02B 5/305; G02B 1/14; G02B 1/04; G02B 5/3025; G02B 5/0841; G02B 1/08; G02B 1/11; G02B 5/22; G02B 5/003
See application file for complete search history.

(56) References Cited

U.S. PATENT DOCUMENTS

| 3,610,729 A | 10/1971 | Rogers |
| 4,446,305 A | 5/1984 | Rogers |

(Continued)

FOREIGN PATENT DOCUMENTS

| CN | 107132606 B | 8/2020 |
| JP | 2015-030765 | 2/2015 |

(Continued)

OTHER PUBLICATIONS

International Search Report for PCT International Application No. PCT/IB2020/054788, mailed on Aug. 11, 2020, 4 pages.

*Primary Examiner* — Mustak Choudhury
(74) *Attorney, Agent, or Firm* — Clifton F. Richardson

(57) ABSTRACT

An optical film includes a plurality of alternating first and second polymeric layers, such that the first polymeric layers have a smaller average in-plane index of refraction than the second polymeric layers and the first polymeric layers have a glass transition temperature of at least 107 deg. C. The optical film may be a reflective polarizer. An optical stack includes a linear absorbing polarizer and the reflective polarizer disposed on, and bonded to, the absorbing polarizer. The reflective polarizer has an optical reflectance of at least 60% for a first polarization state and an optical transmittance of at least 60% for an orthogonal second polarization state. When heated at 105 deg. C. for 15 minutes, a difference in shrinkage of the reflective polarizer and the (Continued)

absorbing polarizer along the first and second polarization states is greater than about zero and 0.2%, respectively.

15 Claims, 6 Drawing Sheets

(56) References Cited

U.S. PATENT DOCUMENTS

| | | |
|---|---|---|
| 4,540,623 A | 9/1985 | Im |
| 5,448,404 A | 9/1995 | Schrenk |
| 5,882,774 A | 3/1999 | Jonza |
| 6,025,897 A | 2/2000 | Weber |
| 6,157,490 A | 12/2000 | Wheatley |
| 6,531,230 B1 * | 3/2003 | Weber ................ B32B 27/08 428/580 |
| 6,783,349 B2 | 8/2004 | Neavin |
| 6,797,396 B1 | 9/2004 | Liu |
| 6,827,886 B2 | 12/2004 | Neavin |
| 6,916,440 B2 | 7/2005 | Jackson |
| 9,279,921 B2 | 3/2016 | Kivel |
| 2006/0084780 A1 | 4/2006 | Hebrink |
| 2006/0099411 A1 | 5/2006 | Xia |
| 2006/0108050 A1 | 5/2006 | Satake |
| 2007/0298271 A1 * | 12/2007 | Liu ................ B42D 25/445 428/480 |
| 2010/0254002 A1 | 10/2010 | Merrill |
| 2015/0369984 A1 * | 12/2015 | Johnson ............ G02B 5/3083 427/163.1 |
| 2016/0195659 A1 | 7/2016 | Johnson |
| 2016/0216427 A1 | 7/2016 | Johnson |
| 2016/0306086 A1 | 10/2016 | Haag |
| 2017/0017117 A1 | 1/2017 | Shimizu |

FOREIGN PATENT DOCUMENTS

| | | |
|---|---|---|
| JP | 2018-105923 | 7/2018 |
| JP | 2018105923 A * | 7/2018 |
| WO | WO2007-149955 | 12/2007 |
| WO | WO2015-195345 | 12/2015 |
| WO | WO2017-205106 | 11/2017 |
| WO | WO2018-101230 | 6/2018 |
| WO | WO2018-163009 | 9/2018 |
| WO | WO2020-234808 | 11/2020 |

* cited by examiner

OPTICAL FILM AND OPTICAL STACK

CROSS REFERENCE TO RELATED APPLICATIONS

This application is a national stage filing under 35 U.S.C. 371 of PCT/IB2020/054788, filed May 20, 2020, which claims the benefit of Provisional Application No. 62/851,991, filed May 23, 2019, the disclosures of which are incorporated by reference in their entirety herein.

BACKGROUND

A polarizer stack may include an absorbing polarizer and a reflective polarizer bonded together. Such polarizer stacks may be used in display applications.

SUMMARY

In some aspects of the present description, an optical stack including a linear absorbing polarizer and a reflective polarizer disposed on, and bonded to, the linear absorbing polarizer is provided. For substantially normally incident light and for at least a first wavelength in a visible wavelength range extending from about 420 nm to about 650 nm: the reflective polarizer has an optical reflectance of at least 60% for a first polarization state and an optical transmittance of at least 60% for an orthogonal second polarization state, and the linear absorbing polarizer has an optical absorbance of at least 60% for the first polarization state and an optical transmittance of at least 60% for the second polarization state. When heated at 105 deg. C. for 15 minutes, a difference in shrinkage of the reflective polarizer and the linear absorbing polarizer along the first and second polarization states is greater than about zero and 0.2%, respectively. The reflective polarizer includes a plurality of alternating first and second polymeric layers, such that for at least the first wavelength, the first polymeric layers have a smaller average in-plane index of refraction than the second polymeric layers. The first polymeric layers have a glass transition temperature of at least 107 deg. C.

In some aspects of the present description, an integrally formed optical film is provided. The integrally formed optical film includes a plurality of alternating first and second polymeric layers numbering at least 50 in total and disposed between opposing outermost polymeric layers. Each first and second polymeric layer is less than about 400 nm thick and each outermost polymeric layer is greater than about 500 nm thick. The first polymeric layers have a glass transition temperature of at least 107 deg. C. and have a smaller average in-plane index of refraction than the second polymeric layers. A minimum average peel strength between two portions of the integrally formed optical film is greater than about 0.4 N/cm where each of the two portions includes one of the outermost polymeric layers. In some embodiments, an optical stack includes a linear absorbing polarizer and the integrally formed optical film disposed on, and bonded to, the linear absorbing polarizer.

DETAILED DESCRIPTION

Figure 1:
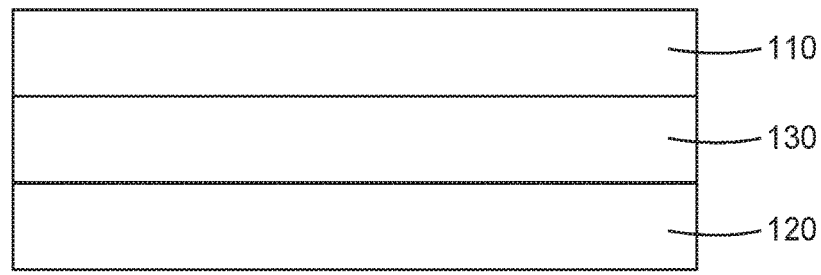
FIG. 1 is a schematic cross-sectional view of an optical stack.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Optical stacks that include an absorbing polarizer and an optical film and/or a reflective polarizer are useful in a variety of display applications. For example, the inner polarizer (the polarizer facing away from the viewer) in a liquid crystal display (LCD) may include an optical stack that includes a reflective polarizer facing the backlight and an absorbing polarizer facing the display panel. Polarizer stacks and their use in display applications are generally described in U.S. Pat. No. 6,025,897 (Weber et al.), for example.

An issue with using an optical stack having an absorbing polarizer and a conventional reflective polarizer in a display is the phenomena of micro-wrinkling which refers to a corrugation/buckling in the layers of the film. Such micro-wrinkling can occur during lamination of the optical stack to a component or can occur over time. For example, the optical stack may be used in an automobile application (e.g., an LCD display in an automobile) where the optical stack may be exposed to elevated temperatures which can lead to micro-wrinkling. Micro-wrinkling is characterized by adjacent surfaces or interfaces of the multilayer film not being parallel to each other. As described in PCT Appl. Publ. No. WO 2017/205106 (Stover et al.) and corresponding U.S. patent application Ser. No. 16/301,106, for example, micro-wrinkling can be reduced by increasing the shrinkage of the reflective polarizer film which avoids compression stresses forming in the reflective polarizer film due to shrinkage of the absorbing polarizer when exposed to elevated temperatures.

The multilayer optical film (e.g., reflective polarizer film) typically includes alternating high and low refractive index layers. According to the present description, it has been found that micro-wrinkling can be reduced by choosing a polymer for the low index layers that has a higher glass transition temperature than conventional polymers chosen for the low index layers. It has conventionally been held that the low index layers should have a relatively low glass transition temperature (e.g., 105 deg. C. or less) in order for the multilayer film to have sufficient delamination resistance or peel strength between adjacent layers. However, it has now been found that using low index layers having a higher glass transition temperature can provide acceptable delamination resistance and result in reduce micro-wrinkling. It has also been found that an adhesive used to bond a multilayer optical film to an absorbing polarizer can be selected to reduce micro-wrinkling. For example, it has been found that an adhesive with a low storage modulus and/or a high tan δ can reduce micro-wrinkling. Any combination of selecting the relative shrinkages of the reflective polarizer or optical film and the absorbing polarizer, selecting the glass transition temperature of the low index layers, or selecting the adhesive can be used to reduce micro-wrinkling.

FIG. 1 is a schematic cross-sectional view of an optical stack 100 which includes linear absorbing polarizer 110 and optical film and/or reflective polarizer 110 disposed on, and bonded to, the linear absorbing polarizer 120. In the illustrated embodiment, the optical film and/or reflective polarizer 110 and the linear absorbing polarizer 120 are bonded together with an adhesive 130. In some embodiments, the optical film and/or reflective polarizer 110 is an integrally formed optical film. In some embodiments, the integrally formed optical film is a reflective polarizer having a pass axis substantially aligned with a pass axis of the linear absorbing polarizer.

Figure 2:
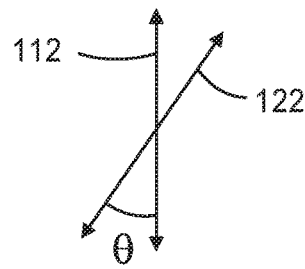
FIG. 2 is a schematic illustration of pass axes of a reflective polarizer and a linear absorbing polarizer.

FIG. 2 is a schematic illustration of a pass axis 112 of a reflective polarizer and a pass axis 122 of a linear absorbing polarizer. An angle θ between the pass axes 112 and 122 is illustrated. The pass axes may be described as substantially aligned when the angle is less than about 30 degrees, for example. In some embodiments, the angle θ is less than about 30 degrees, or less than about 10 degrees, or less than about 5 degrees, or less than about 3 degrees.

In some embodiments, an optical stack 100 includes a reflective polarizer 110 and a linear absorbing polarizer 120 bonded together with an adhesive 130 having a storage modulus G' at 105 deg. C. of less than about 10 kPa and a loss modulus G" at 105 deg. C. such that a ratio (tan δ) of the loss modulus G" to the storage modulus G' is at least about 0.4, or at least about 0.5, or at least about 0.6. In some such embodiments or in other embodiments, the adhesive 130 has a storage modulus G' at 105 deg. C. of less than about 8 kPa. It has been found that using an adhesive with a low (e.g., less than about 10 kPa or less than about 8 kPa) storage modulus and/or a high tan δ (at least about 0.4, or at least about 0.5, or at least about 0.6) reduces micro-wrinkling of the optical stack. The moduli G' and G" can be determined using dynamic mechanical analysis (DMA), for example. The moduli G' and G" are determined at a frequency of 1 Hz, unless indicated differently. The moduli can be determined according to the ASTM D4065-12 test standard, for example.

In some embodiments, when heated at 105 deg. C. for 15 minutes, a difference in shrinkage of the reflective polarizer 110 and the linear absorbing polarizer 120 along orthogonal first and second polarization states (e.g., along directions parallel to the first and second polarization states 215 and 219 depicted in FIG. 3) is greater than about zero and 0.2%, respectively (e.g., greater than −0.01% and 0.18%, respectively, or greater than 0% and 0.2%, respectively, or greater than 0.01% and 0.22%, respectively). For example, the linear absorbing polarizer 120 may have shrinkages of 0.1% and 0.3% along pass and block axes while the reflective polarizer has shrinkages of 0.3% and 0.6% along pass and block axes, so that the difference in shrinkage of the reflective polarizer and the absorbing polarizer along the pass and block axes are 0.2% and 0.3%, respectively. In some embodiments, the difference in shrinkage of the reflective polarizer 110 and the linear absorbing polarizer 120 along the second polarization state is greater than about 0.25%, or greater than about 0.3%. In some embodiments, the difference in shrinkage of the reflective polarizer 110 and the linear absorbing polarizer 120 along the first polarization state is greater than about 0.05%, or greater than about 0.1%, or greater than about 0.15%. The difference in shrinkages may be less than 5%, or less than 3%, or less than 1% in along each polarization state. It has been found that having a difference in shrinkage in these ranges results in reduced micro-wrinkling of the optical stack during lamination of the optical stack to other components or during aging at elevated temperature, for example. The difference in shrinkage can be controlled by controlling the shrinkage of the optical film and/or reflective polarizer 110 as described further elsewhere herein.

Figure 3:
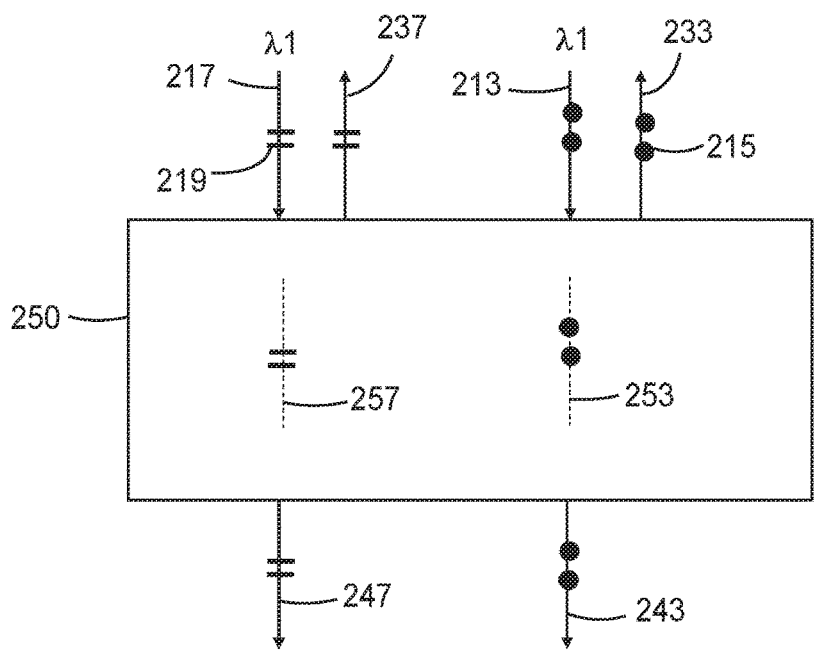
FIG. 3 is a schematic cross-sectional view of an optical member.

FIG. 3 is a schematic cross-sectional view of an optical member 250 which may correspond to optical film 110 or to linear absorbing polarizer 120, for example. Optical member 250 may be one or more of a linear absorbing polarizer, an optical film, a reflective polarizer, or a plurality of alternating first and second polymeric layers. Substantially normally (e.g., within 30 degrees, or within 20 degrees, or within 10 degrees, or within 5 degrees of normal) incident light 213 having a first wavelength λ1 and having first polarization state 215 is schematically illustrated. A portion 233 of the incident light 213 is reflected (optical reflectance times the incident energy), a portion 253 (schematically illustrated by broken lines with no arrows of the incident light 213 is absorbed (optical absorbance times the incident energy), and a portion 243 of the incident light 213 is transmitted (optical transmittance times the incident energy). Substantially normally incident light 217 having the first wavelength λ1 and having a second polarization state 219 orthogonal to the first polarization state 215 is schematically illustrated. A portion 237 of the incident light 217 is reflected (optical reflectance times the incident energy), a portion 257 of the incident light 217 is absorbed (optical absorbance times the incident energy), and a portion 247 of the incident light 217 is transmitted (optical transmittance times the incident energy).

In some embodiments, for substantially normally incident light and for at least a first wavelength in a visible wavelength range extending from about 420 nm to about 650 nm: the reflective polarizer has an optical reflectance of at least 60% for a first polarization state 215 and an optical transmittance of at least 60% for an orthogonal second polarization state 219, and the linear absorbing polarizer has an optical absorbance of at least 60% for the first polarization state 215 and an optical transmittance of at least 60% for the second polarization state 219. In some embodiments, the reflective polarizer includes a plurality of alternating first and second polymeric layers. In some embodiments, for substantially normally incident light and for at least the first wavelength, the plurality of alternating first and second polymeric layers has an optical reflectance greater than about 80% for the first polarization state 215, an optical transmittance greater than about 85% for the second polarization state 219, and an optical transmittance less than about 0.1% for the first polarization state 215. In some embodiments, the linear absorbing polarizer has an optical absorbance of at least 70% for the first polarization state 215 and an optical transmittance of at least 70% for the second polarization state 219.

Multilayer optical films that provide desirable transmission and/or reflection properties at least partially by an arrangement of microlayers of differing refractive index, are known. Such optical films have been demonstrated, for example, by coextrusion of alternating polymer layers, casting the layers through a film die onto a chill roll, and then stretching the cast web. See, e.g., U.S. Pat. No. 3,610,729 (Rogers), U.S. Pat. No. 4,446,305 (Rogers et al.), U.S. Pat.

No. 4,540,623 (Im et al.), U.S. Pat. No. 5,448,404 (Schrenk et al.), U.S. Pat. No. 5,882,774 (Jonza et al.), U.S. Pat. No. 6,157,490 (Wheatley et al.), U.S. Pat. No. 6,783,349 (Neavin et al.), and U.S. Pat. No. 9,279,921 (Kivel et al.), and International Appl. Pub. No. 2018/163009 (Haag et al.). In these polymeric multilayer optical films, polymer materials may be used predominantly or exclusively in the makeup of the individual layers. Such films are compatible with high volume manufacturing processes and can be made in large sheets and roll goods.

The shrinkage of a multilayer optical film can be controlled by controlling the stress during cooling of the film after stretching the film. It has generally been found that a higher stress during this cooling results in a larger shrinkage. In some embodiments, after stretching the film a heat set is applied. The heat set can be carried out in the last zones of the tenter oven used to orient the film as described in U.S. Pat. No. 6,827,886 (Neavin et al.). Typically, such heat set processes are used in order to reduce or minimize the shrinkage of the film when heat is subsequently applied to the film. When it is desired to minimize the subsequent shrinkage of the film, the heat set temperature may be set to the highest temperature that does not result in film breakage in the tenter and the film can be relaxed in the transverse direction in the vicinity of the heat-set zone which decreases the tension of the film. Higher shrinkage, particularly in the machine direction (typically along the pass axis when the optical film is a reflective polarizer) can be achieved by reducing the heat set temperature, by reducing the duration of the heat set treatment for a given heat set temperature and/or by eliminating the heat set step. Higher shrinkage, particularly in the transverse direction (typically along the block axis when the optical film is a reflective polarizer), can be achieved reducing the relaxation of the film in the block direction. This can be done, for example, by adjusting the spacing between the tenter rails after heat setting. Reducing this spacing is often referred to as toe-in. The effects of heat set temperature and toe-in on film shrinkage are described in U.S. Pat. No. 6,797,396 (Liu et al.), for example. Thus, by controlling the heat set and toe-in conditions, desired shrinkages in the transverse direction and in the machine direction when the optical film heated at 105 deg. C. for 15 minutes can be achieved. Shrinkage of an optical can be determined according to the ASTM D2732-14 test standard, "Standard Test Method for Unrestrained Linear Thermal Shrinkage of Plastic Film and Sheeting", for example.

Figure 4:
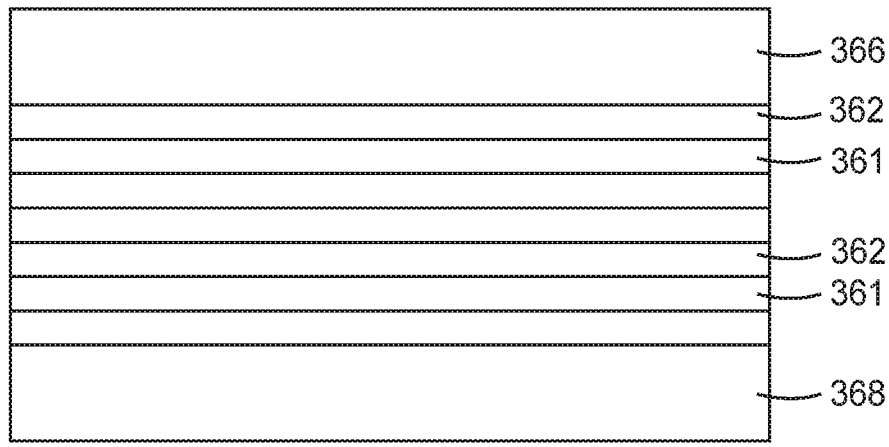
FIG. 4 is a schematic cross-sectional view of an optical film.

FIG. 4 is a schematic cross-sectional view of an optical film 310, which may be a reflective polarizer, including a plurality of alternating first and second polymeric layers 361 and 362 disposed between opposing outermost layers 366 and 368 of the optical film 310. The optical film 310 may be an integrally formed optical film and the outermost layers 366 and 368 may be polymeric layers. In some embodiments, the first polymeric layers 361 have a smaller average in-plane index of refraction (average of refractive index along two orthogonal in-plane directions, such as along orthogonal first and second polarization states) than the second polymeric layers 362. For example, the second polymeric layers 362 may be oriented layers having a larger index of refraction along a first in-plane direction and a smaller index of refraction along a second in-plane direction, while the first polymeric layers 361 may have a substantially same index of refraction along each of the first and second in-plane directions that is substantially equal to the index of refraction of the second polymeric layers along the second in-plane direction. The index of refraction may be specified at the first wavelength $\lambda 1$ of FIG. 3, for example. If a wavelength is not otherwise specified, the index of refraction can be understood to be the index of refraction determined at a wavelength of 532 nm. The in-plane directions refer to directions in the plane of the film when the film is laid flat or to directions in a plane tangent to the film if the film is curved.

In some embodiments, at least the second polymeric layers 362 are substantially uniaxially oriented. For example, in some embodiments, the optical film 310 is a reflective polarizer that is a substantially uniaxially drawn film and has a degree of uniaxial character U of at least 0.7, or at least 0.8, or at least 0.85, where $U=(1/MDDR-1)/(TDDR^{1/2}-1)$ with MDDR defined as the machine direction draw ratio and TDDR defined as the transverse direction draw ratio. Such substantially uniaxially oriented multilayer optical films are described in U.S. Pat. No. 2010/0254002 (Merrill et al.), for example.

In some embodiments, each layer in the first and second polymeric layers 361 and 362 is less than about 500 nm thick, or less than about 400 nm thick, or less than about 300 nm thick, or less than about 250 nm thick. The thickness of the first and second polymeric layer 361 and 362 may be selected to provide a desired reflectance for light at a given wavelength (e.g., a total optical thickness of a pair of adjacent layers may be selected to be half the given wavelength). The thickness of the first and second polymeric layer 361 and 362 may be varied over the thickness of the optical film to provide a desired reflectance over a predetermined wavelength range (e.g., extending from about 450 nm to about 650 nm, or from about 420 nm to about 650 nm, or from about 400 nm to about 700 nm).

The total number of first and second polymeric layers 361 and 362 may be substantially greater than schematically illustrated in FIG. 4. In some embodiments, the plurality of alternating first and second polymeric layers 361 and 362 number at least 50 in total (e.g., 100 to 500 total layers) and is disposed between opposing outermost polymeric layers 366 and 368, where each first and second polymeric layer 361 and 362 is less than about 400 nm thick, and each outermost polymeric layer 366 and 368 is greater than about 500 nm thick. In some embodiments, the plurality of alternating first and second polymeric layers 361 and 361 of the optical film 310 is disposed between opposing outermost layers 366 and 368 of the optical film 310, where each outermost layer 366, 368 has a thickness from about 0.5 microns to about 5 microns. In some embodiments, each outermost polymeric layer 366 and 368 is less than about 2 micrometers thick, or less than about 1.5 micrometers thick, or less than 1 micrometer thick. It has been found that using outermost layers having such thickness can improve the delamination resistance of the optical film.

In some embodiments, for a substantially normally incident light in a predetermined wavelength range, the optical film 300, or the plurality of alternating first and second polymeric layers 361 and 362, has an average optical reflectance greater than about 80% for a first polarization state, an average optical transmittance greater than about 85% for an orthogonal second polarization state, and an average optical transmittance less than about 0.2% or less than about 0.1% for the first polarization state. Optical films having such transmittances and reflectances are described in International Appl. Pub. No. WO 2018/163009 (Haag et al.), for example.

The optical films or reflective polarizers of the present description may be integrally formed. As used herein, a first element "integrally formed" with a second element means that the first and second elements are manufactured together rather than manufactured separately and then subsequently joined. Integrally formed includes manufacturing a first element followed by manufacturing the second element on the first element. An optical film including a plurality of layers is integrally formed if the layers are manufactured together (e.g., combined as melt streams and then cast onto a chill roll to form a cast film which is then oriented) rather than manufactured separately and then subsequently joined. An integrally formed optical film or reflective polarizer may include one or more packets of alternating polymeric layers where each of the alternating polymeric layers in each packet is less than about 400 nm thick. A layer thicker than about 500 nm may separate adjacent packets and/or layers thicker than about 500 nm may be disposed at outermost surfaces of the one or more packets. Such layers may be protective boundary layers (PBLs) included to prevent flow profiles in the coextruded web of alternating polymer layers from producing optical defects in the alternating polymer layers.

In some embodiments, an optical film includes two packets of alternating polymeric layers and a plurality (e.g., at least 3 or 3 to 20) of thinner (e.g., less than 400 nm thick, or less than 300 nm thick) PBLs disposed between the two packets. This has been found to improve delamination resistance between adjacent packets as described further in co-owned Prov. Pat. Appl. No. 62/852,112 filed on May 23, 2019 and titled "MULTILAYER OPTICAL FILM".

In some embodiments, the first polymeric layers 361 have a glass transition temperature of at least 107 deg. C., or at least 109 deg. C., or at least 112 deg. C., or at least 115 deg. C. In some embodiments, the glass transition temperature of the first polymeric layers 361 is no more than 125 deg. C. or no more than 120 deg. C. Using first polymeric layers 361 having a glass transition temperature in any of these ranges has been found to result in acceptable delamination resistance the optical film 310 and to result in reduced microwrinkling. In some embodiments, the outermost layers 366 and 368 have a glass transition temperature in any of these ranges. In some embodiments, the outermost layers 366 and 368 are formed from a same material as the first polymeric layers 361.

The glass transition temperature can be determined by differential scanning calorimetry (DSC), for example. The ASTM D3418-15 test standard or the ASTM E1356-08 (2014) test standard, for example, can be used to determine the glass transition temperature by DSC. Alternatively, the glass transition temperature can be determined by dynamic mechanical analysis (DMA). The ASTM E1640-18 test standard, for example, can be used to determine the glass transition temperature by DMA. Polymers having a desired glass transition temperature can be formed by blending different polymers having different glass transition temperatures at a ratio that results in the desired glass transition temperature and/or including different segments in a copolymer at a ratio that results in a desired glass transition temperature. For example, a blend of polycarbonate and copolyester can result in a glass transition temperature in the desired ranges. In some embodiments, the low index layers (e.g., first polymeric layers 361) are formed from a blend of polycarbonate, PETG (a copolyester of polyethylene terephthalate (PET) with cyclohexane dimethanol used as a glycol modifier; available from Eastman Chemicals, Knoxville, TN) and PCTG (a copolyester of PET with twice the amount of cyclohexane dimethanol used as a glycol modifier compared to PETG; available from Eastman Chemicals, Knoxville, TN). The proportion of polycarbonate used can be selected to give a desired glass transition temperature. In some embodiments, the high index layers (e.g., second polymeric layers 362) are formed from polyethylene naphthalate (PEN) or a PEN/polyethylene terephthalate (PET) copolymer. Other polymeric materials known to be useful in polymeric multilayer optical films may alternatively be used.

The delamination resistance can be characterized in terms of a peel force between portions of the optical film. The delamination resistance can be expressed in grams/in (understood to be grams-force per inch) or N/cm, for example. For example, in some embodiments, a minimum average peel strength between two portions of an integrally formed optical film 310 is greater than about 0.4 N/cm (e.g., greater than 0.36 N/cm or greater than 0.38 N/cm), or at greater than about 0.6 N/cm, or greater than about 0.8 N/cm, where each of the two portions include one of the outermost polymeric layers 366, 368. In some embodiments, the minimum average peel strength is determined using a substantially 90-degree peel test at a peel speed of about 1.5 m/min, where the minimum average peel strength is the minimum of the peel strength averaged over an averaging time of about 5 seconds.

Figure 5:
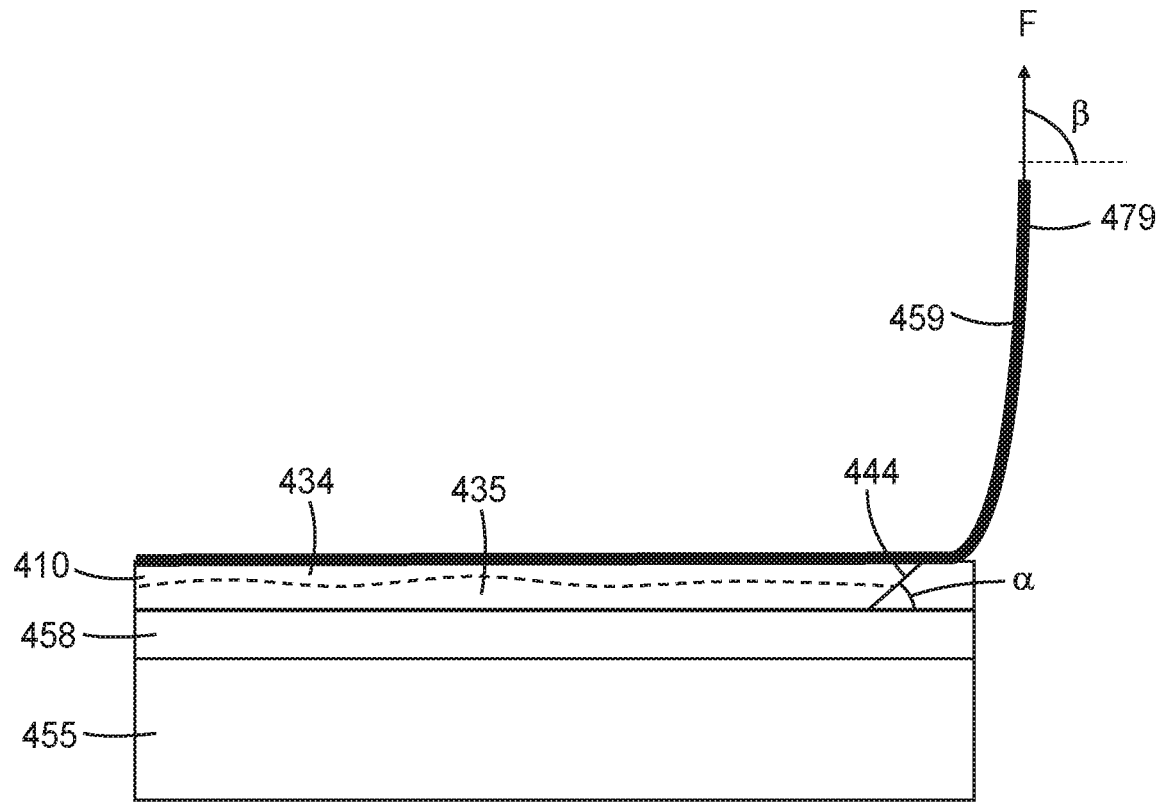
FIG. 5 is a schematic illustration of a peel test.

FIG. 5 schematically illustrates a peel test applied to an integrally formed optical film 410, which may correspond to optical film 310, for example. The optical film 410 may be cut into a standard size for testing (e.g., 1 inch (2.54 cm) wide by 12 inch (30 cm) strips). Double-sided tape 458 (e.g., 3M 665 Double Sided Tape available from 3M Company, St. Paul, MN) is attached to a plate 455 (e.g., a metal plate) and the film 410 is attached to the double-sided tape 448. The film 410 is scored (e.g., with a razor blade) near an edge of the film along score line 444 which makes an angle α with a major surface of the plate 455 that is in a range of 20 to 60 degrees, or 30 to 45 degrees, for example. A tape 459 is applied to the film 410 such that the tape 459 covers at least the scored portion of the film 410 and such that a free end 479 of the tape 459 is available for peel testing. For example, the tape 459 may be an approximately 1.5 in (4 cm) strip of 3M 396 tape available from 3M Company, St. Paul, MN The free end 479 used for gripping during peel testing may be folded onto itself to form a non-sticky tab (e.g., an approximately ½ inch (1.3 cm) tab). A substantially 90-degree peel test is then be performed by peeling from the free end 479. For example, the angle β between the pull direction (schematically illustrated by the applied force F in FIG. 5) and a direction parallel to a top surface of the plate 455 may be about 90 degrees. The peel test is carried out with a peel speed (speed of the free end 479 along the pull direction) in a range of about 1.2 to about 1.8 m/min (e.g. about 1.5 m/min). The peel test can be performed using an IMASS SP-2000 peel tester (IMASS Inc., Accord, MA), for example. The peel strength is averaged over an averaging time of about 4 to about 6 seconds (e.g., about 5 seconds). The average peel strength can be determined for a single averaging time for each one of multiple samples (e.g., five film samples), or for multiple intervals of the averaging time for a single (e.g., longer) sample. The minimum of these average peel strengths is referred to as the minimum average peel strength.

The peel strength is between two portions 434 and 435 of the optical film 410 where each of the two portions 434, 435 include one of the outermost polymeric layers (e.g., outermost layer 366 or 368 depicted in FIG. 4). For example, during the peel test, the optical film 410 may delaminate at an interface between one of the outermost layers and one of the alternating first and second layers (e.g., first and second layers 361 and 362) so that one of the two portions 434, 435 includes the delaminated outermost layer and the other of the two portions 434, 435 include the remainder of the optical film 410. As another example, the optical film 410 may delaminate at an interface between two internal layers so that each portion 434 and 435 includes an outermost layer and at least one of the alternating first and second layers. As still another example, the delamination may start at an interface between an outermost layer and one of the alternating first and second layers and then propagate into the internal layers of the optical film 410 so that each portion 434 and 435 comprise portions of an internal layer.

EXAMPLES

Peel Strength Test Method

Film samples were prepared and cut into 1 inch (2.54 cm) wide by 12 inch (30 cm) strips. Double sided tape (3M 665 Double Sided Tape available from 3M Company, St. Paul, MN) was attached to a metal plate and a sample strip was attached to the double sided tape. The excess film was cut from one end of the plate so that the film was flush with that edge of the plate while the other edge was scored by cutting at a sharp angle with a razor blade. One end of an approximately 1.5 in (4 cm) strip of tape (3M 396 tape available from 3M Company, St. Paul, MN) was folded onto itself to form a 1/2 inch (1.3 cm) non-sticky tab. The other end of the tape was applied to the scored edge of the film sample. A 90-degree peel test was then performed using an IMASS SP-2000 peel tester (IMASS Inc., Accord, MA) with a peel speed of 60 in/min (1.5 m/min) using a 5 second averaging time. Five strips were tested for each film sample. For the results given in the Examples, the minimum value is reported for sake of comparing weakest or lowest force required to delaminate layers from each other.

Shrinkage Test Method

Shrinkage was determined as generally described in the ASTM D2732-14 test standard except that an oven was used instead of a constant-temperature liquid bath. The samples were conditioned in desiccant chamber (<20% RH) for >24 hrs prior to testing. The samples were tested at 105° C. (oven set point) for 15 minutes.

Comparative Example C1

A birefringent reflective polarizer optical film was prepared as follows. Two multilayer optical packets were co-extruded with each packet comprised of 325 alternating layers of polyethylene naphthalate (PEN) and a low index isotropic layer, which was made with a blend of polycarbonate and copolyesters (PC:coPET) such that the index is about 1.57 and remained substantially isotropic upon uniaxial orientation, where the PC:coPET weight ratio was approximately 41 wt % PC and 59 wt % coPET and has a Tg of 105.8 degrees centigrade. This isotropic material was chosen such that after stretching its refractive indices in the two non-stretch directions remains substantially matched with those of the birefringent material in the non-stretching direction while in the stretching direction there is a substantial mis-match in refractive indices between birefringent and non-birefringent layers. The PEN and PC:coPET polymers were fed from separate extruders to a multilayer coextrusion feedblock, in which they were assembled into two packets of 325 alternating optical layers, plus a thicker protective boundary layer of the PC/coPET on the outsides of the stacked optical packets, and in between the packets, 9 alternating inner protective boundary layers of optical thickness but not in coherence, for a total of 661 layers. The multilayer melt was then cast through a film die onto a chill roll, in the conventional manner for polyester films, upon which it was quenched. The cast web was then stretched in a parabolic tenter as described in U.S. Pat. No. 6,916,440 (Jackson et al.) at approximately a 6:1 ratio in the transverse direction at a temperature of 320° F.

Figure 6:
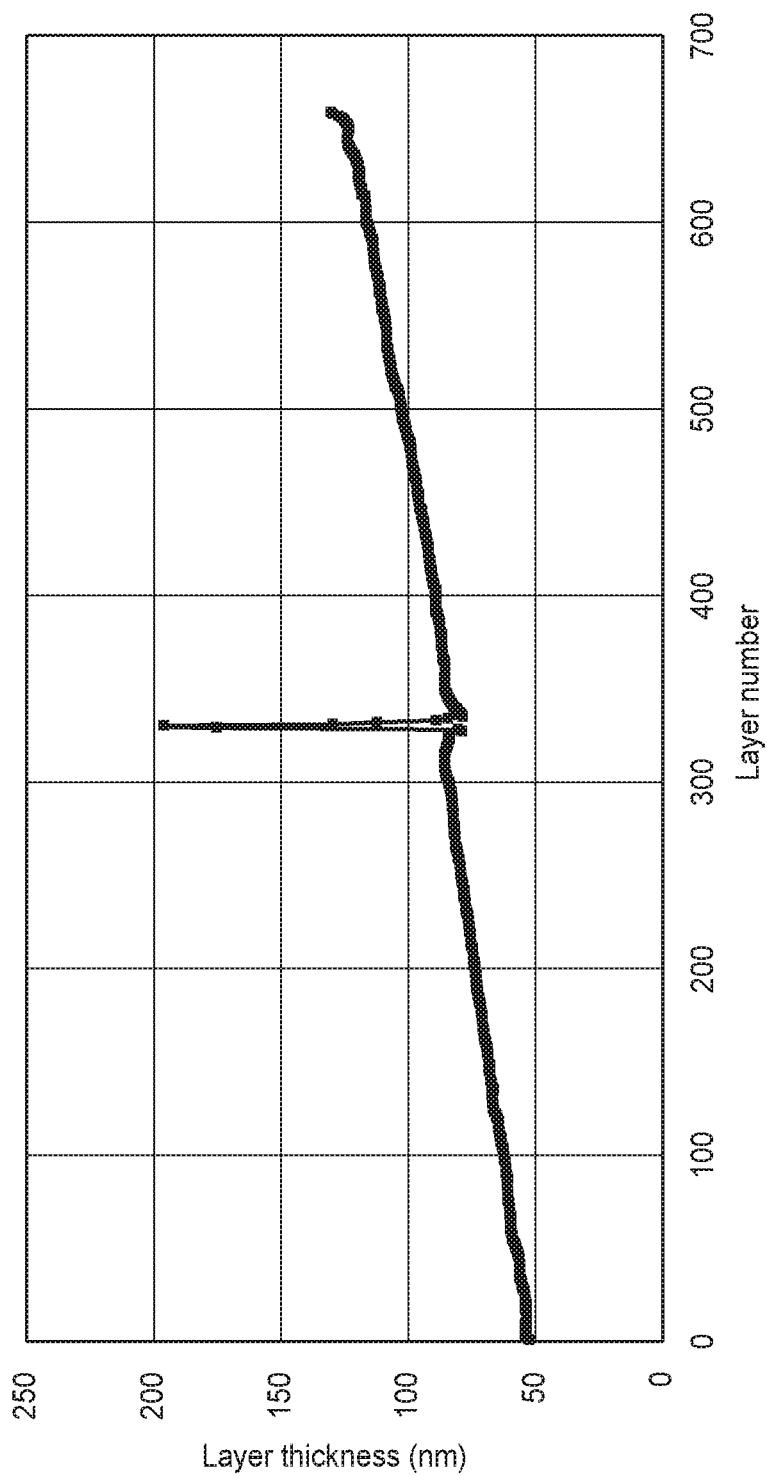
FIG. 6 is a plot showing the layer thickness profile of a reflective polarizer.
Figure 7:
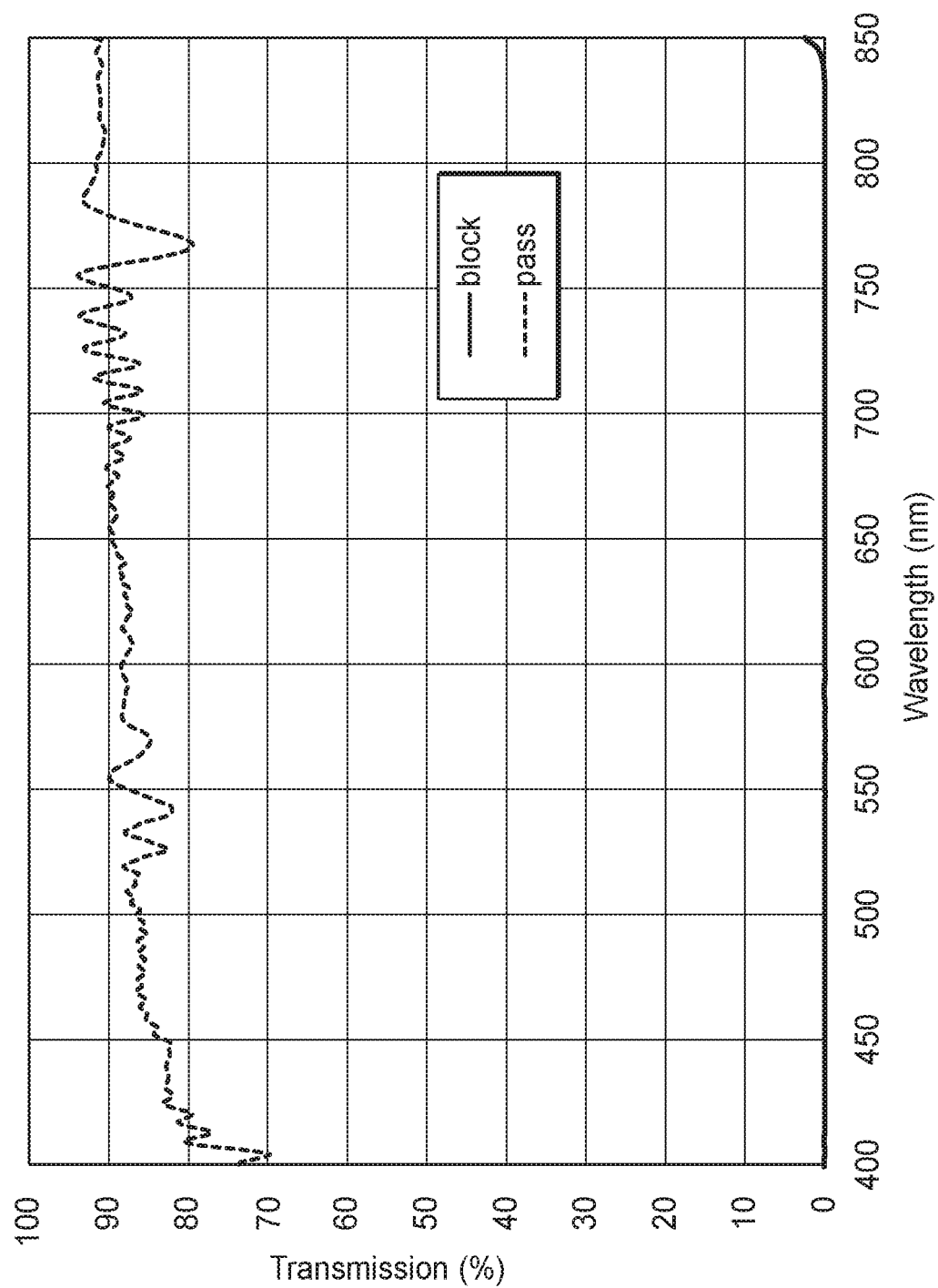
FIG. 7 is a plot of transmission versus wavelength for the reflective polarizer of FIG. 6.

The layer thickness profile for the optical film of Comparative Example 1 is shown in FIG. 6. The pass and block transmission at normal incidence were determined and are shown in FIG. 7. The average transmission from 450-650 nm for block and pass polarizations was 0.011% and 86.7% respectively. The film of Comparative Example 1 had a resulting total thickness as measured by a capacitance gauge of approximately 58.9 µm. The shrinkage for 15 minutes at 105° C. was about 1.01% in the machine direction (MD) and about 0.15% in the transverse direction (TD). The minimum average peel force was 256.7 g/in.

A Sanritz 5518 absorbing polarizer, which includes an adhesive layer, was laminated to the optical film using the adhesive on the Sanritz polarizer to provide an optical stack.

Example 1

A birefringent reflective polarizer optical film was prepared as follows. Two multilayer optical packets were co-extruded with each packet having of 325 alternating layers of 90/10 coPEN, a polymer composed of 90% polyethylene naphthalate (PEN) and 10% polyethylene terephthalate (PET) and a low index isotropic layer, which was made with a blend of polycarbonate and copolyesters (PC:coPET) such that the index was about 1.57 and remained substantially isotropic upon uniaxial orientation, where the PC:coPET weight ratio was approximately 61 wt % PC and 39 wt % coPET and had a Tg of 116.4 degrees centigrade. This isotropic material was chosen such that after stretching its refractive indices in the two non-stretch directions remains substantially matched with those of the birefringent material in the non-stretching direction while in the stretching direction there is a substantial mis-match in refractive indices between birefringent and non-birefringent layers. The PEN and PC/coPET polymers were fed from separate extruders to a multilayer coextrusion feedblock, in which they were assembled into two packets of 325 alternating optical layers, plus a thicker protective boundary layer of the PC/coPET on the outsides of the stacked optical packets, and in between the packets, 9 alternating inner protective boundary layers of optical thickness but not in coherence, for a total of 661 layers. The multilayer melt was then cast through a film die onto a chill roll, in the conventional manner for polyester films, upon which it was quenched. The cast web was then stretched in a parabolic tenter as described in U.S. Pat. No. 6,916,440 (Jackson et al.) at approximately a 6:1 ratio in the transverse direction at a temperature of 300° F.

Figure 8:
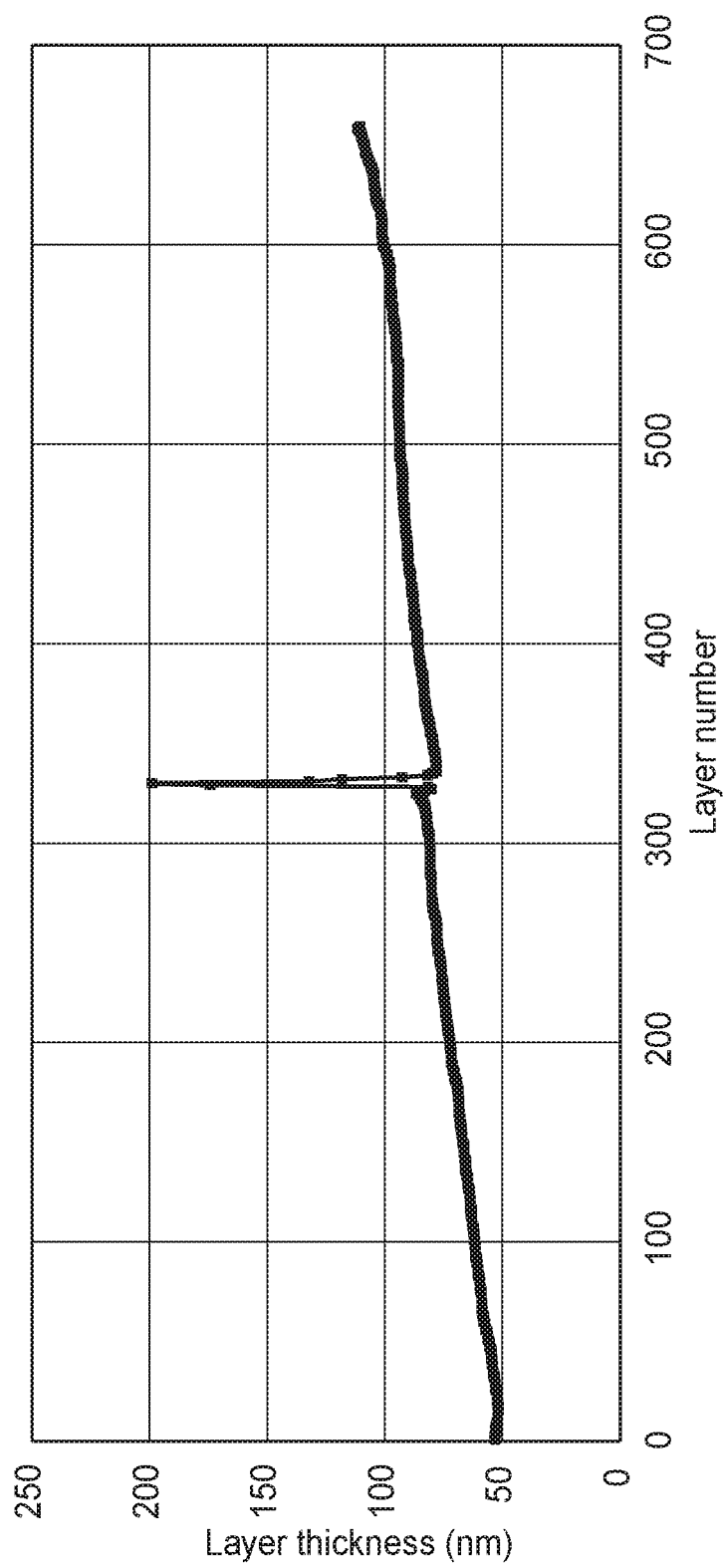
FIG. 8 is a plot showing the layer thickness profile of another reflective polarizer.
Figure 9:
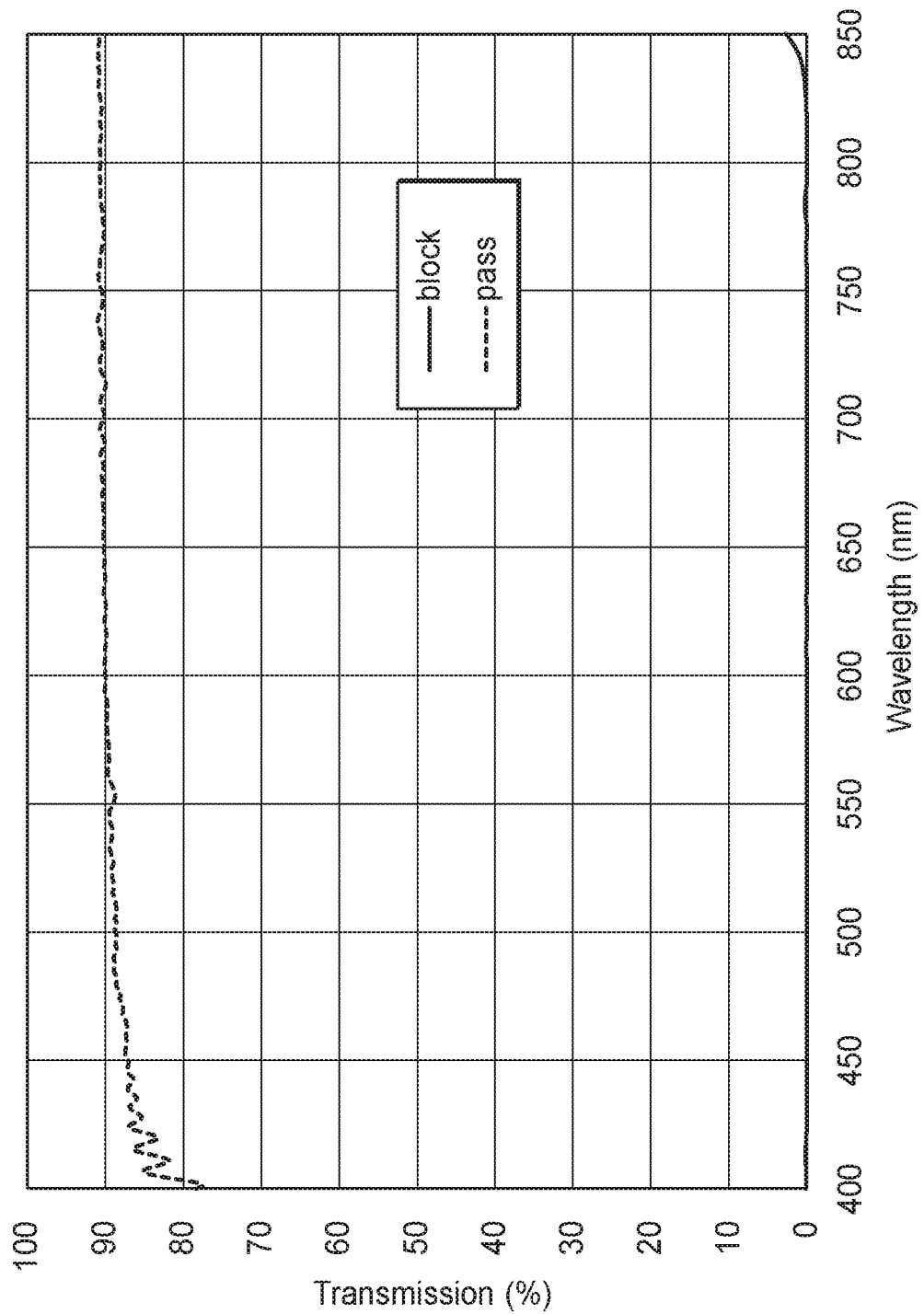
FIG. 9 is a plot of transmission versus wavelength for the reflective polarizer of FIG. 8.

The layer thickness profile for the optical film of Example 1 is shown in FIG. 8. The pass and block transmission at normal incidence were determined and are shown in FIG. 9. The average transmission from 450-650 nm for block and pass polarizations was 0.021% and 89.2% respectively. The film of Example 1 had a resulting total thickness as measured by a capacitance gauge of approximately 58.7 µm. The shrinkage for 15 minutes at 105° C. was 0.31% and 0.57% for MD and TD, respectively. The minimum average peel force was 226.9 g/in.

A Sanritz 5518 absorbing polarizer (available from Sanritz Co., Ltd., Japan), which includes an adhesive layer, was laminated to the optical film using the adhesive on the Sanritz polarizer to provide an optical stack. The shrinkage of the Sanritz polarizer for 15 minutes at 105° C. was 0.10% and 0.30% along the pass and block axes, respectively.

Examples 2-8

Examples 2-8 were prepared in a similar manner to Example 1, expect for the changes shown in Table 1. The glass transition temperature (Tg) of the low index optical (LIO) layers was calculated from the glass transition temperatures of the PC and coPET used in the blend. The PC and CoPET loadings, the calculated Tg, the pass and block state shrinkages at 105° C. for 15 minutes, the difference, Δ, between the pass and block state shrinkages for the sample and Sanritz polarizer at 105° C. for 15 minutes, and the minimum average peel force is reported in Table 1.

TABLE 1

| Example | PC amount weight % | CoPET weight % | Tg LIO Calc. ° C. | Pass State % Shrink | Block State % Shrink | Δ Shrink % Pass | Δ Shrink % Block | Peel force (g/in) |
|---|---|---|---|---|---|---|---|---|
| C1 | 41 | 59 | 104.2 | 1.01 | 0.15 | 0.91 | −0.15 | 256.7 |
| 1 | 61 | 39 | 116.4 | 0.31 | 0.57 | 0.22 | 0.27 | 226.9 |
| 2 | 55 | 45 | 111.9 | 0.58 | 0.57 | 0.48 | 0.27 | 155.0 |
| 3 | 49 | 51 | 107.6 | 0.79 | 0.48 | 0.70 | 0.18 | 168.9 |
| 4 | 61 | 39 | 116.4 | 0.40 | 0.32 | 0.30 | 0.02 | 164.0 |
| 5 | 61 | 39 | 116.4 | 0.23 | 0.76 | 0.14 | 0.46 | 206.1 |
| 6 | 61 | 39 | 116.4 | 1.41 | −0.21 | 1.32 | −0.51 | 98.7 |
| 7 | 55 | 45 | 111.9 | 0.73 | 0.34 | 0.63 | 0.04 | 157.2 |
| 8 | 49 | 51 | 107.6 | 0.91 | 0.28 | 0.82 | −0.02 | 228.4 |

Microwrinkle Testing 3M 8171 adhesive (obtained from 3M company, St. Paul, MN) was laminated to opposite sides of optical stacks of Comparative Example C1 and Examples 1-8 and then laminated to glass slides.

Two samples from each stack of Comparative Example C1 and Examples 1-3 of were put into and oven set at 105° C. for 225 hours and into a thermal cycle oven of 20 cycles at 105° C. for 30 minutes to −40° C. for 30 minutes. After each oven condition, Comparative Example 1 had microwrinkles and Examples 1-3 did not.

Two samples from each stack of Comparative Example C1 and Examples 4-8 were put into and oven set at 105° C. for 24 hours. After 24 hours, removed from the oven, allowed to cool to room temperature and inspected for microwrinkling. Comparative Example 1 had microwrinkles and Examples 4-8 did not.

To test the effect of the adhesive between the reflective polarizer and the absorbing polarizer, various adhesives were used between the reflective polarizer of Comparative Example C1 and a Sanritz 5518 absorbing polarizer. The adhesive on the Sanritz polarizer was used to laminate the optical stack to a glass slide. Samples were placed in an autoclave at 50° C. and 0.5 MPa for 20 minutes to ensure good bonding. The bonded samples were place in oven set at 105° C. for 24 hours. The samples were then removed from the oven, allowed to cool to room temperature and inspected for microwrinkling. The results are reported in the following table. The adhesives were obtained from 3M Company (St. Paul, MN). The moduli were determined using DMA at 105° C.

| Adhesive | Storage Modulus (Pa) | Loss Modulus (Pa) | Loss Tangent | Microwrinkling |
|---|---|---|---|---|
| 3M 3101 | 62410 | | | Severe |
| 3M 8146 | 49604 | | | Severe |
| 3M L113 | 38912 | | | Severe |
| 3M 8211 | 33434 | | | Severe |
| 3M 8171 | 32889 | | | Severe |
| Similar to 3M 2901 but modified to change modulus | 13790 | | | Severe |
| 3M 2901 | 8659 | 4432 | 0.517 | Slight |
| Similar to 3M 2901 but modified to change modulus | 7439 | 4841 | 0.65 | None detected |
| 3M CEF1902 | 7283 | 3403 | 0.467 | Slight |

-continued

| Adhesive | Storage Modulus (Pa) | Loss Modulus (Pa) | Loss Tangent | Microwrinkling |
|---|---|---|---|---|
| (UV cured) 3M CEF1902 (not UV cured) | 5138 | 4062 | 0.79 | None detected |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. If the use of "about" as applied to differences in quantities expressing feature sizes, amounts, and physical properties is not otherwise clear to one of ordinary skill in the art in the context in which it is used and described in the present description, "about" as applied to the difference will be understood to mean within 10 percent of the quantity having the smaller magnitude. For example, if "about zero" as applied to the difference between a quantity have a value of 0.275 and a quantity having a value of 0.3 is not otherwise clear to one of ordinary skill in the art in the context in which it is used and described in the present description, since the difference differs from zero by less than 10 percent of 0.275, the difference is about zero. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical stack comprising:
    a linear absorbing polarizer; and
    a reflective polarizer disposed on, and bonded to, the linear absorbing polarizer, for substantially normally incident light and for at least a first wavelength in a visible wavelength range extending from about 420 nm to about 650 nm:
        the reflective polarizer has an optical reflectance of at least 60% for a first polarization state and an optical transmittance of at least 60% for an orthogonal second polarization state; and
        the linear absorbing polarizer has an optical absorbance of at least 60% for the first polarization state and an optical transmittance of at least 60% for the second polarization state;
    wherein, when heated at 105 deg. C. for 15 minutes, a difference in shrinkage of the reflective polarizer and the linear absorbing polarizer along the first and second polarization states is greater than about zero and 0.2%, respectively; and
    wherein the reflective polarizer comprises a plurality of alternating first and second polymeric layers, such that for at least the first wavelength, the first polymeric layers have a smaller average in-plane index of refraction than the second polymeric layers, the first polymeric layers having a glass transition temperature of at least 107 deg. C.

2. The optical stack of claim 1, wherein the first polymeric layers having a glass transition temperature of at least 109 deg. C.

3. The optical stack of claim 1, wherein the first polymeric layers having a glass transition temperature of at least 115 deg. C.

4. The optical stack of claim 1, wherein each layer in the first and second polymeric layers is less than about 500 nm thick.

5. The optical stack of claim 4, wherein the plurality of alternating first and second polymeric layers of the reflective polarizer are disposed between opposing outermost layers of the reflective polarizer, each outermost layer having a thickness from about 0.5 microns to about 5 microns.

6. The optical stack of claim 1, wherein at least the second polymeric layers are substantially uniaxially oriented.

7. The optical stack of claim 1, wherein for substantially normally incident light and for at least the first wavelength, the plurality of alternating first and second polymeric layers has an optical reflectance greater than about 80% for the first polarization state, an optical transmittance greater than about 85% for the second polarization state, and an optical transmittance less than about 0.1% for the first polarization state.

8. The optical stack of claim 1, wherein the reflective polarizer and the linear absorbing polarizer are bonded together with an adhesive having a storage modulus G' at 105 deg. C. of less than about 10 kPa and a loss modulus G" at 105 deg. C. such that a ratio of the loss modulus G" to the storage modulus G' is at least about 0.5.

9. An integrally formed optical film comprising a plurality of alternating first and second polymeric layers numbering at least 50 in total and disposed between opposing outermost polymeric layers, each first and second polymeric layer less than about 400 nm thick, each outermost polymeric layer greater than about 500 nm thick, the first polymeric layers having a glass transition temperature of at least 107 deg. C. and having a smaller average in-plane index of refraction than the second polymeric layers, a minimum average peel strength between two portions of the integrally formed optical film being greater than about 0.4 N/cm, each of the two portions comprising one of the outermost polymeric layers.

10. The optical film of claim 9, wherein the minimum average peel strength is greater than about 0.6 N/cm, or greater than about 0.8 N/cm.

11. The optical film of claim 9, wherein each outermost polymeric layer is less than about 2 micrometers thick.

12. The optical film of claim 9, wherein for substantially normally incident light and for at least a first wavelength in a visible wavelength range extending from about 420 nm to about 650 nm, the plurality of alternating first and second polymeric layers has an optical reflectance greater than about 80% for a first polarization state, an optical transmittance greater than about 85% for an orthogonal second polarization state, and an optical transmittance less than about 0.1% for the first polarization state.

13. An optical stack comprising:
    a linear absorbing polarizer; and
    the optical film of claim 9 disposed on, and bonded to, the linear absorbing polarizer.

14. The optical stack of claim 13, wherein the optical film comprises a reflective polarizer having a pass axis substantially aligned with a pass axis of the linear absorbing polarizer.

15. The optical stack of claim 13, wherein the optical film and the linear absorbing polarizer are bonded together with an adhesive having a storage modulus G' at 105 deg. C. of less than about 10 kPa and a loss modulus G" at 105 deg. C. such that a ratio of the loss modulus G" to the storage modulus G' is at least about 0.5.

* * * * *